United States Patent [19]
Ichikawa et al.

[11] Patent Number: 5,725,925
[45] Date of Patent: Mar. 10, 1998

[54] PACKING MATERIAL FOR REFRACTORY

[75] Inventors: Kenji Ichikawa, Okayama; Hajime Asami, Okayama-ken; Kazushi Maruyama; Junichi Inoue, both of Bizen, all of Japan

[73] Assignee: Shinagawa Refractories Co., Ltd., Tokyo, Japan

[21] Appl. No.: 624,633

[22] PCT Filed: Mar. 2, 1994

[86] PCT No.: PCT/JP94/00335

§ 371 Date: Apr. 10, 1996

§ 102(e) Date: Apr. 10, 1996

[87] PCT Pub. No.: WO95/10492

PCT Pub. Date: Apr. 20, 1995

[30] Foreign Application Priority Data

Oct. 15, 1993 [JP] Japan ................. 5-258261

[51] Int. Cl.$^6$ ......................................... B32B 1/04
[52] U.S. Cl. .................. 428/68; 266/905; 428/70; 428/74; 428/75; 428/76; 428/472; 428/472.1
[58] Field of Search .................. 428/68, 70, 75, 428/76, 74, 472, 472.1, 472.2; 206/905

[56] References Cited

U.S. PATENT DOCUMENTS

| | | | |
|---|---|---|---|
| 2,038,034 | 4/1936 | Fowler | 428/75 |
| 3,302,358 | 2/1967 | Jackson | 428/75 |
| 3,968,281 | 7/1976 | Erickson | 428/75 |
| 4,359,496 | 11/1982 | Kratel | 428/75 |

FOREIGN PATENT DOCUMENTS

| | | | |
|---|---|---|---|
| 6114111 | 8/1980 | Japan . | |
| 4-154676 | 5/1992 | Japan . | |
| 5-163073 | 6/1993 | Japan . | |
| 5-163074 | 6/1993 | Japan . | |
| 763412 | 12/1956 | United Kingdom | 428/75 |

*Primary Examiner*—Nasser Ahmad
*Attorney, Agent, or Firm*—Larson & Taylor

[57] ABSTRACT

A packing material for refractory capable of restraining the deterioration of working environment since there is generated no smoke and foul smell even if used for setting preheated submerged nozzles or long nozzles, allowing easy visual observation of fitting operation, and maintaining the packing material deformation suppression performance. A packing material for refractory of the present invention is characterized in that a part or the whole surface of a packing base material for refractory formed from inorganic refractory powder, inorganic and/or organic fibrous raw material, and being agents and/or various types of additives is covered with a metal foil. This packing material may be used together with an inorganic paint or ceramic fiber sheet, and when so used, the metal foil is to be applied to the outermost surface thereof. In addition, a metal foil having recessed and raised portions thereof may be used.

6 Claims, 7 Drawing Sheets

PACKING MATERIAL FOR REFRACTORY

FIELD OF THE INVENTION

This invention relates to a packing material which is interposed between refractories having excellent corrosion resistancy, airtightness and release properties against molten metals, and more particularly to a packing material for refractory in which the surface of a packing base material shaped from a refractory and comprising a composition conventionally used is covered with at least one of a metal foil and/or an inorganic paint, and a ceramic fiber sheet.

BACKGROUND OF THE INVENTION

As such kinds of refractory packing materials are known the one disclosed in the applicant's Patent Publication No. 61-14111, and the ones or filling materials described in the applicant's Patent Kokai No. 4-154676, Patent Kokai No. 5-163073 and Patent Kokai No. 5-163074.

In mounting various kinds of members made of refractories, which are used, for example, as means for controlling the flow of a molten metal, problems have so far been involved such as deterioration of working environment due to the smoke or foul smell generated from the binder during the period (about 60 seconds) when a packing is set to a preheated submerged nozzle or long nozzle and the nozzle is fitted into a chute nozzle, and such as incapable confirmation of the fitting working by visual observation.

Other problems are such that during the period when a packing is set said heated nozzle and such nozzle is fitted into a chute nozzle the packing is hardened by heat thereby causing bad sealing properties, air leakage, leakage of molten steel, and abnormal melting down of the nozzle brick.

Still other problems are such that though there is carried out even a working method where a packing is adhered or mounted to the chute nozzle in advance and the preheated nozzle is fitted to said chute nozzle the packing generates smoke due to the heat of the preheated nozzle thereby causing incapable confirmation of the fitting working by visual observation or incapable automatic fitting using a sensor.

Other problems are whether the packing is involved with deformation property or not as disclosed said Kokai (Laid-Open) specifications.

DISCLOSURE OF THE INVENTION

To improve the various, above-mentioned drawbacks of said known packing materials the inventors have made intensive researches and experiments, and as the result they have developed a packing material for refractory, in which even if an organic material is used as a binder at about 800° C. of preheating temperature, smoke and foul smell do not generate. Technically the present invention relates to a packing material for refractory characterized in that at least a part or the whole surface of a packing base material for refractory formed from inorganic refractory powder, inorganic and/or organic fibrous raw material, and binding agents and/or various types of additives is covered with a metal foil. Said metal foil may be such as processed in recessed and raised form, at least a part of the outer surface of said packing base material previously adhered or mounted to the shaped refractory to be applied, may be covered with the metal foil, the end face of said packing base material may not be covered with the metal foil, and the metal foil may be co-used with an inorganic paint or a ceramic fiber sheet, and in said co-use the metal foil covers the outermost surface of the packing base material.

Owing to such technical constitution, if the packing material of the invention is applied in setting a submerged nozzle or a long nozzle, the working environment is prevented from deterioration without generation of smoke or foul smell, the visual observation for the fitting operation becomes easy, and it becomes possible to maintain the deformation property of the packing material.

THE BEST MODE FOR CARRYING OUT THE INVENTION

In the present invention the covering to the shaped packing base material is made in a single layer or a plurality of layers for the following reasons.

Ordinarily, the preheating temperature of the respective members to be fitted is about 800° C., and in such case a single covering of a metal foil will suffice. However, when the preheating temperature is high such as about 1,000° C. the above-mentioned effect will not be achieved with the metal foil only, so that the constitution will be made in two layers or three layers where an inorganic paint and/or a ceramic fiber sheet are interposed between the metal foil and the shaped packing base material.

As the shaped packing base material referred to in the present invention, the suitable one will be the refractory packing material disclosed in Japanese Patent Publication No. 61-14111 filed by the applicant or the flexible, refractory packing material disclosed in Japanese Patent Publication No. 5-20472 filed by the applicant, too. However, not limited to the packing material compositions disclosed in these publications it is possible to use the packing materials or the filling materials referred to above.

Though platinum, aluminium, tin and these alloys may be used as the material of the metal foil employed in the invention, the metal foil of aluminium or its alloys will be the best from the viewpoint of cost, handling easiness, heat resistancy after oxidation and corrosion resistancy.

The function of Al or Al-based alloy foil results such that the temperature rise of the packing base material is delayed and the gas generated from said base material is isolated from the open air to allow ignition and smoke generation to be delayed.

The melting point of Al is about 660° C., but in the case of its foil form its surface oxidation will not develop to melt the whole foil. On the other hand, alumina formed by oxidation of aluminium is excellent for both heat resistancy (melting point 2050° C.) and corrosion resistancy.

The optimum thickness of aluminium foil is in the range 0.01 to 0.5 mm. If the foil is not thicker than 0.01 mm it is likely to be broken when handling, and also it is apt to be broken by the gas pressure when subjected to heating. If the foil thickness exceeds 0.5 mm the flexibility of the foil becomes bad so that it becomes difficult to work the packing base material to a desired shape. Further, such packing base material will be inferior in deformation property (following-up property to some recesses and rises of the brick) when working. Furthermore, oxidation of the packing base material becomes difficult when subjected to heating, and the molten aluminium is separated whereby it is inferior in sealing property.

As the ceramic fiber sheet there may be employed a paper-like sheet such as of alumina fiber, zirconium fiber, and ordinary alumina-silica base fiber. When viewed from cost, the alumina-silica base fiber sheet will be the best. The suitable thickness of the sheet is between 0.1 mm and 2.0 mm, and if it is not more than 0.1 mm it lacks the heat insulating effect so as not to produce a combustion prevention effect. If it exceeds 2.0 mm the sheet may provide a good heat insulating property but it will be inferior in sealing property as a packing material.

As the suitable inorganic paint to be employed there may be mentioned the heat-resistant composition (commercially sold by the applicant as "TAC") disclosed in the applicant's Patent Publication No. 58-44634 or the inorganic heat-resistant paint (commercially sold by the applicant as "N-TAC") disclosed in the applicant's Patent Kokai No. 63-135462. The covering thickness may be in the range 0.05 to 1.00 mm, and if it exceeds 1.00 mm it will reversely affect the softness of the packing base material while hardening said base material so as not to be preferable.

EXAMPLE

The applicant of this invention previously proposed a refractory packing material having refractory flexibility and pressure-applying compressibility as disclosed in Patent Kokai No. 55-109550. This packing material is obtained in such a manner that it bases, as its major material, on 100 parts by weight of two materials of inorganic refractory powder and inorganic fiber, two materials of inorganic refractory powder and organic fiber, or three materials of inorganic refractory powder, inorganic fiber and organic fiber, the mixture thereof is added, as a binder and a resinous component, with 3–50 parts by weight of synthetic resinous emulsion and/or rubber latex, and the mixture is shaped and dried. On the other hand, the applicant also proposed previously a flexible refractory board (see Patent Kokai No. 55-7514) which is characterized in that it bases on 100% part by weight of inorganic refractory powder alone, or two materials of inorganic refractory powder and inorganic fiber, two materials of inorganic refractory powder and organic fiber, or three materials of inorganic refractory powder, inorganic fiber and organic fiber, and the mixture thereof is added, as a binder and a resinous component, with 3–50 parts by weight of synthetic resinous emulsion and/or rubber latex.

Figure 1:
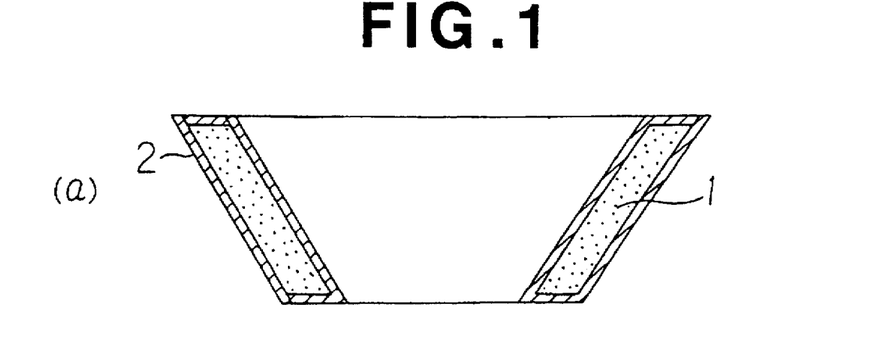
FIG. 1 is a sectional view of the packing material in which the whole surface of a dish-like packing base material is covered with a metal foil.

When each of such packing materials was set to a refractory material preheated at 800° C. it was burned in several seconds and generated black smoke. Each of these packing materials was made a base material 1 (3.0 mm thick), and it the whole surface thereof was doubly covered with a 0.015 mm thick aluminium foil 2. FIG. 1 is a sectional view of a dish-like (bottomless) packing material and FIG. 2 is a sectional view of an annular packing material.

Figure 2:
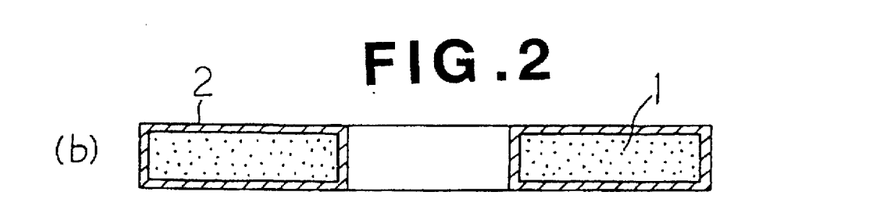
FIG. 2 is a sectional view of the packing material in which the whole surface of an annular packing base material is covered with a metal foil.
Figure 3:
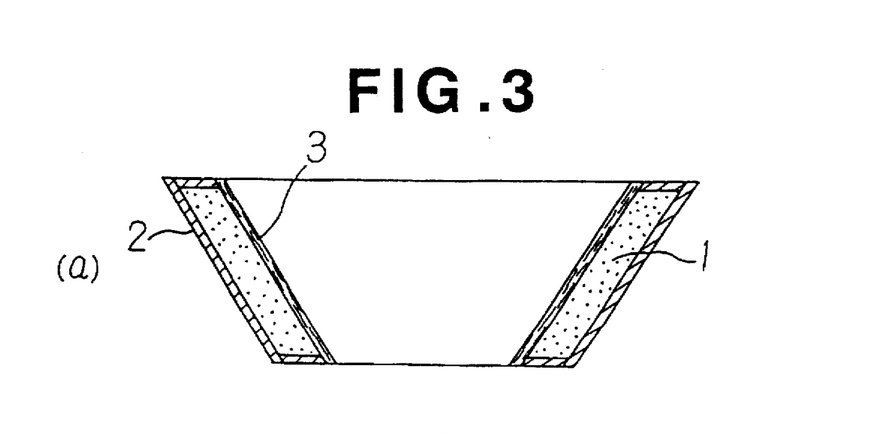
FIG. 3 is a sectional view of another example of the invention, in which the inner peripheral surface of the dish-like packing base material is covered with a ceramic fiber sheet and the other surfaces thereof are covered with a metal foil.
Figure 4:
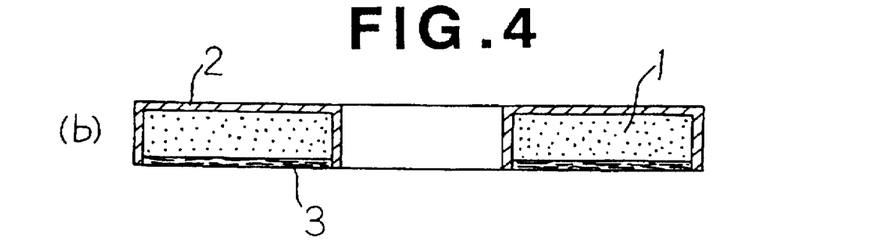
FIG. 4 is a sectional view of still another example of the invention, in which the bottom surface of the annular packing base material is covered with a ceramic fiber sheet while the other surfaces thereof are covered with a metal foil.

FIG. 3 and FIG. 4 are sectional views same as FIG. 1 and FIG. 2, which show examples where a part of the packing base material is covered with a ceramic fiber sheet 3 and the other surfaces with an aluminium foil 2.

Figure 5:
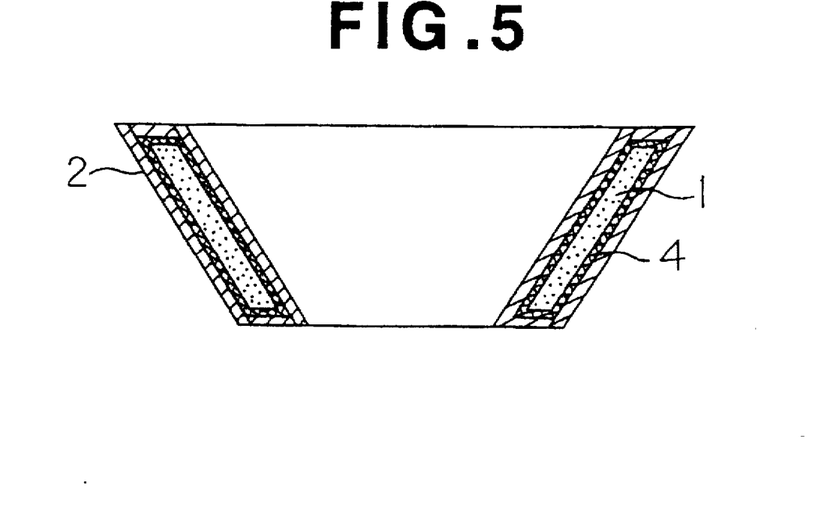
FIG. 5 is a sectional view of an example in which over the whole outer peripheral surface of the dish-like packing base material, the inner layer is covered with an inorganic paint and the outer layer with a metal foil respectively.

FIG. 5 is a sectional view of the dish-like packing material of the present invention, in which the inner layer is covered with an inorganic paint 4 and the outer layer with the aluminium foil 2.

Figure 6:
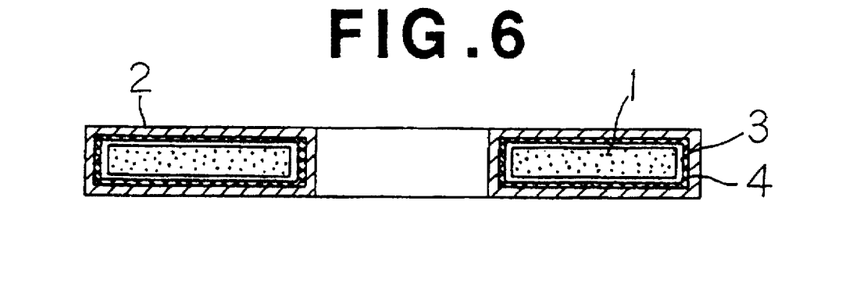
FIG. 6 is a sectional view of an example in which over the outer peripheral surface of the annular packing base material, the inner layer is covered with an inorganic paint while the outer layer is covered with a metal foil like in FIG. 5.

FIG. 6 is a sectional view of an example where the packing base material 1 was covered with three layers, the innermost layer being the ceramic fiber sheet 3, the intermediate layer being an inorganic paint, and the outermost layer being the aluminium foil 2. Additionally, in each of said FIGURES the thickness of the covered layer is illustrated in magnification for illustration purposes.

Figure 7:
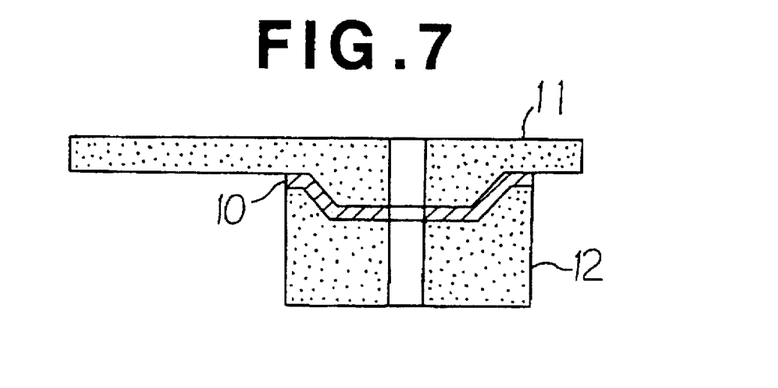
FIG. 7 is a sectional view of an example in which the packing material of the invention is applied between the slide plate and chute nozzle of a sliding nozzle apparatus.

FIG. 7 is a sectional view of essential portion, which shows an example where the packing material of the present invention is applied to a slide nozzle apparatus. The reference numeral 11 designates a slide plate, 12 a chute nozzle, and 10 a refractory packing material respectively.

Figure 8:
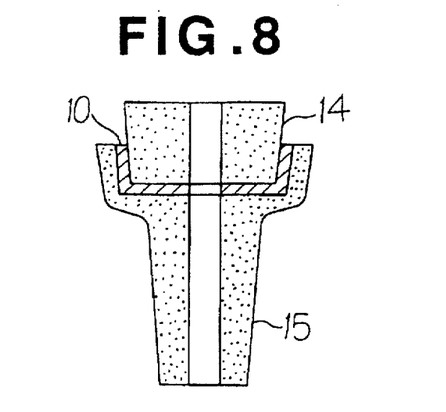
FIG. 8 is a sectional view of an example in which the packing material of the invention is applied between a tundish nozzle and a submerged nozzle.

FIG. 8 is a sectional view of essential portion, which shows an example where a refractory packing material of the present invention is interposed between a tundish nozzle 14 and a submerged nozzle 15.

Figure 9:
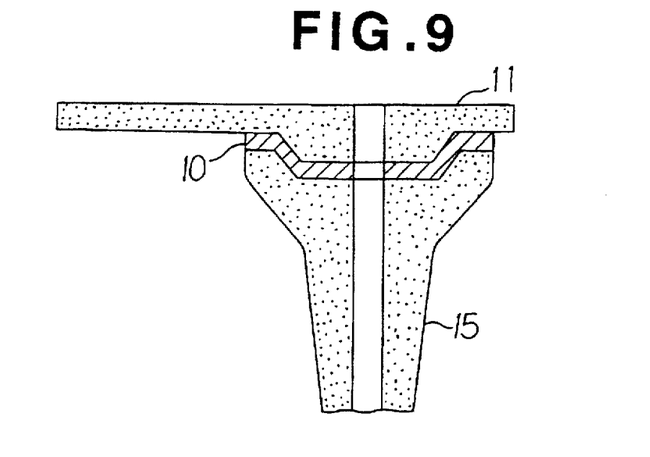
FIG. 9 is a sectional view of an example in which the packing material of the invention is applied between a slide plate and a submerged nozzle.

FIG. 9 is a sectional view of essential portion, which shows an example where the refractory packing material 10 is interposed between the slide plate 11 of the slide nozzle apparatus and the submerged nozzle 15.

Figure 10:
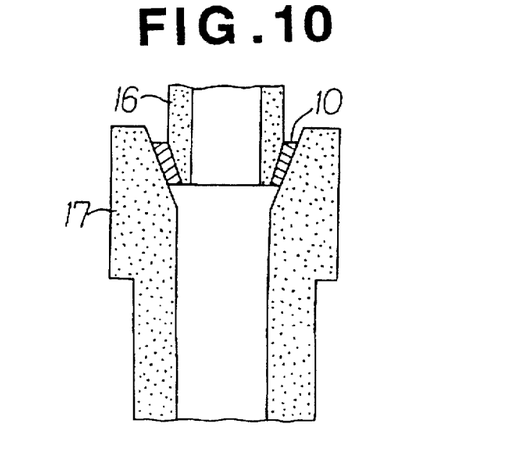
FIG. 10 is a sectional view of an example in which the packing material of the invention is applied between a collector nozzle and an air seal pipe.

FIG. 10 is a sectional view of essential portion in which the refractory packing material 10 is interposed between a collector nozzle 16 and an air sealing pipe 17. To add, the section of the packing material of the present invention, which is shown in FIGS. 7 to 10, is illustrated with hatching only.

Figure 11:
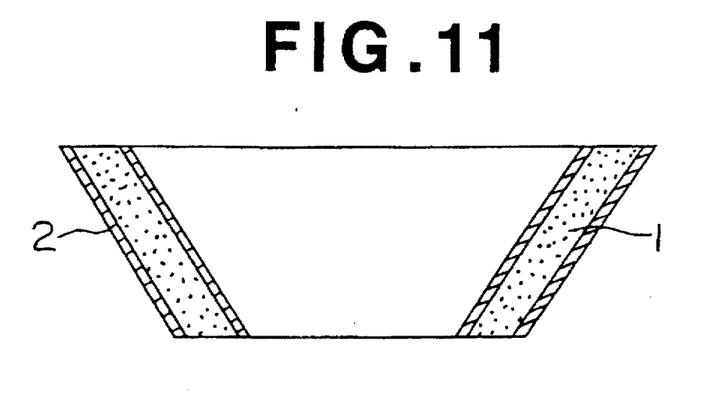
FIG. 11 is a sectional view of an example in which a metal foil is applied to the inner and outer peripheral surfaces of the dish-like packing base material.
Figure 12:
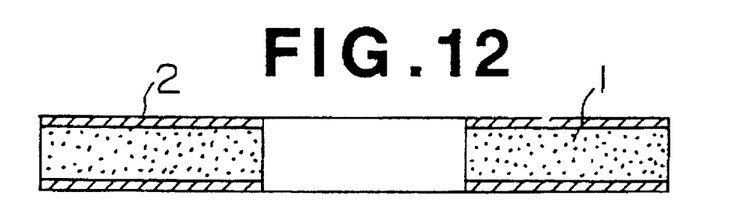
FIG. 12 is a sectional view of an example in which a metal foil is applied to the upper and lower surfaces of the annular packing base material.

FIG. 11 shows an example where only the inner and outer peripheral surfaces of the dish-like packing base material are covered with a metal foil, and FIG. 12 is a sectional view showing an example where only the upper and lower surfaces of the annular packing base material are covered with a metal foil.

In the packing materials as constituted above it was recognized that though their control effect of smoke generation is inferior to be about 40 seconds compared with those wholly covered it is possible sufficiently to retain the deformation control property of the packing materials until the fitting and assembling of the applying refractory are completed.

Figure 13:
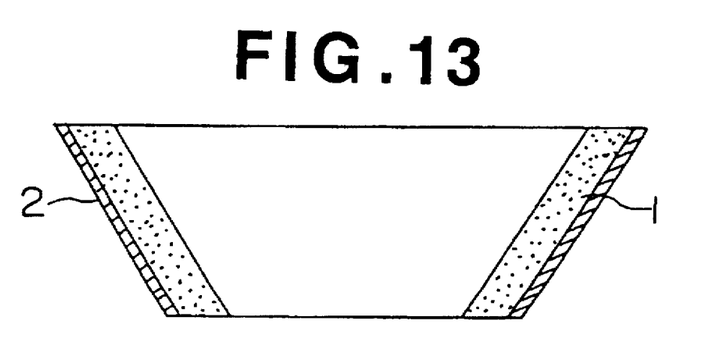
FIG. 13 is a sectional view of an example in which a metal foil is applied to the outer peripheral surface only of the dish-like packing base material.
Figure 14:
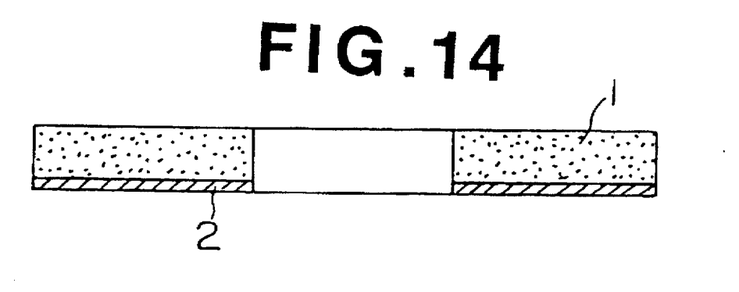
FIG. 14 is a sectional view of an example in which a metal foil is applied to the lower surface only of the annular packing base material.

FIG. 13 shows an example in which only the outer peripheral surface of the dish-like packing base material is covered with a metal foil, and FIG. 14 is a sectional view of an example in which only the bottom surface of the annular packing base material is covered with a metal foil.

Such constitutions are of packing materials in case the surface not covered with a metal foil is adhered in advance with an applicable refractory. Even if such packing materials are fitted with a refractory such as a preheated submerged nozzle or the like which is set to the lower portion of the packing material it is possible to control the smoke generation to about 40 seconds, and it was recognized that it is capable of retaining the deformation control performance of the packing materials until the assembling is completed.

Figure 15:
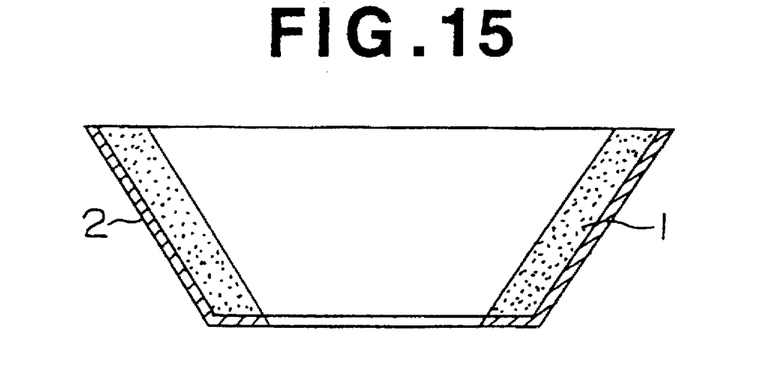
FIG. 15 is a sectional view of an example in which a metal foil is applied to the outer peripheral surface and bottom surface of the dish-like packing base material.
Figure 16:
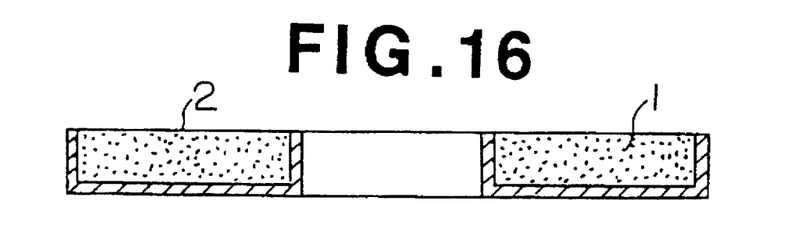
FIG. 16 is a sectional view of an example in which a metal foil is applied to the outer and inner peripheral surfaces and bottom surface of the annular packing base material.

FIG. 15 and FIG. 16 are of the same examples as those described above, but they are sectional views of the examples where all the other portions than the adhesive surface with the applying refractory are covered with the metal foil. In these constitutions the same effect as in said examples was observed excepting that in the case of fitting a preheated refractory the effect of controlling the smoke generation is prolonged in time by about 60 second.

Figure 17:
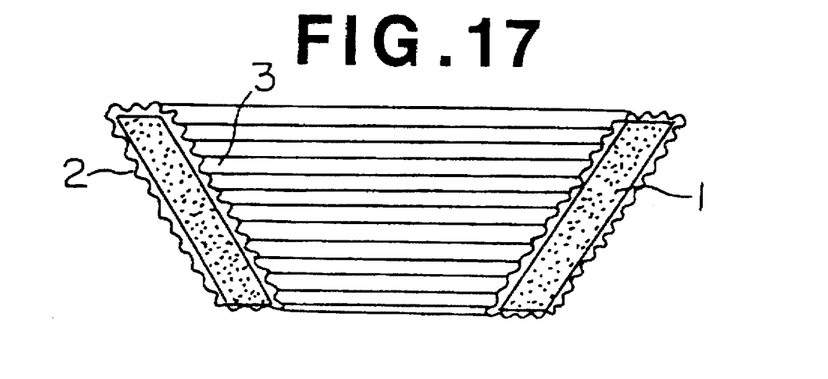
FIG. 17 is a sectional view of an example in which a recessed and raised metal foil is applied to the whole peripheral surface of the dish-like packing base material.
Figure 18:
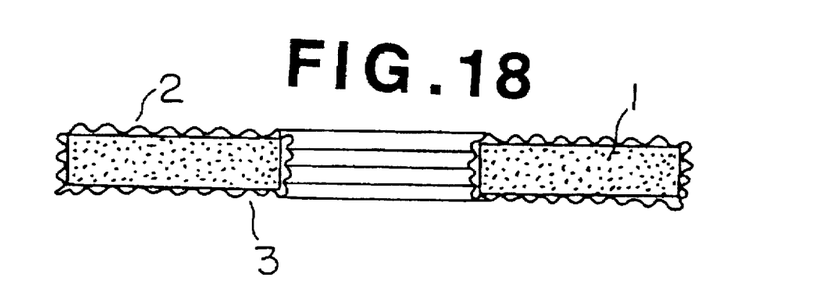
FIG. 18 is a sectional view of an example in which a recessed and raised metal foil is applied to the whole peripheral surface of the annular packing base material.

FIG. 17 and 18 are sectional views of the examples where the packing material is covered with a metal foil having recessed and raised portions, and in the packing material of such constitution it was confirmed that the effect of controlling the smoke generation is improved by about 10 percent compared with the examples of FIG. 1 and FIG. 2.

FIG. 19 to FIG. 22 are schematic views of working examples of the packing material according to the present invention.

Figure 19:
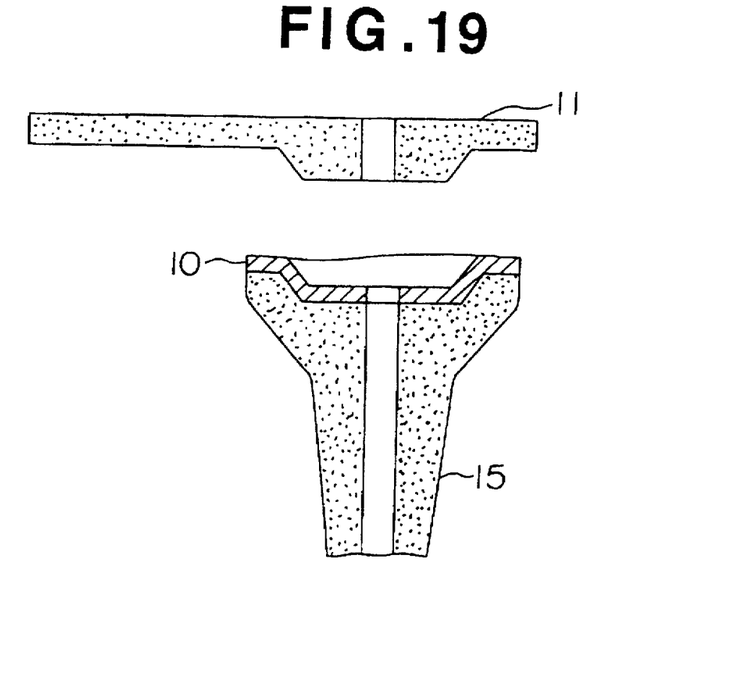
FIGS. 19 to 22 are model type views showing the working examples of the packing materials of the invention.
Figure 20:
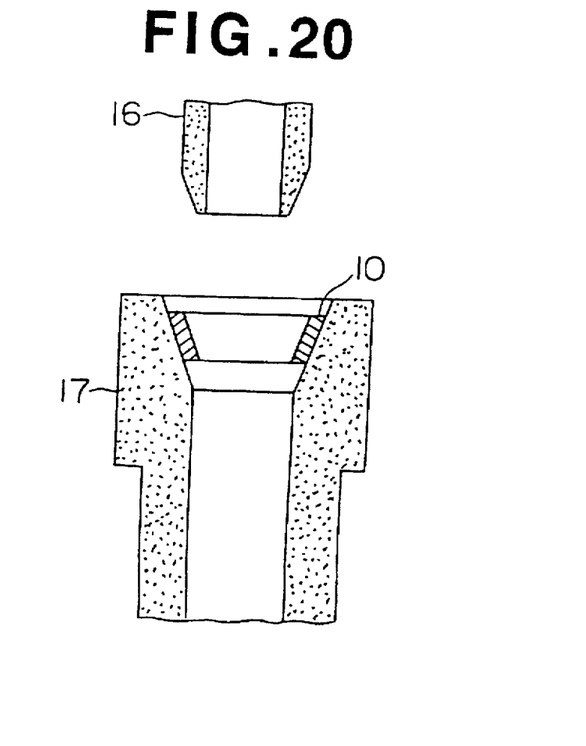

FIG. 19 shows a state where the upper surface of the preheated submerged nozzle 15 is previously mounted with the packing material 10 and then it is engaged with the slide plate 11. FIG. 20 shows a state where the upper funnel portion of the preheated air sealing pipe 17 is previously mounted with the packing base material so as to be engaged with the collector nozzle 16.

Figure 21:
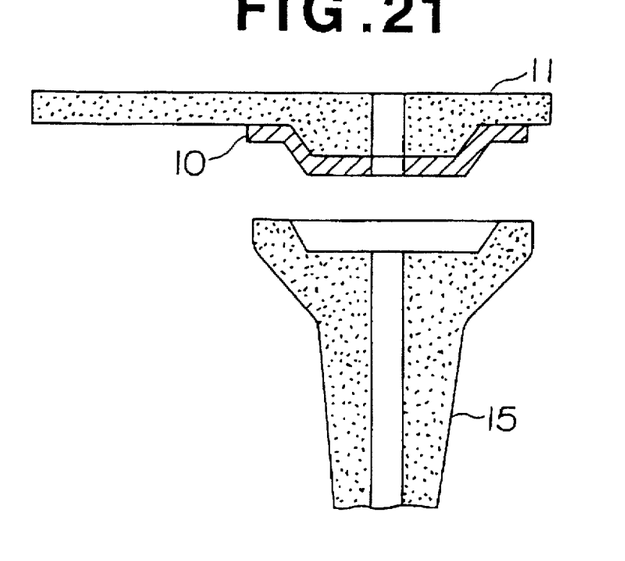
Figure 22:
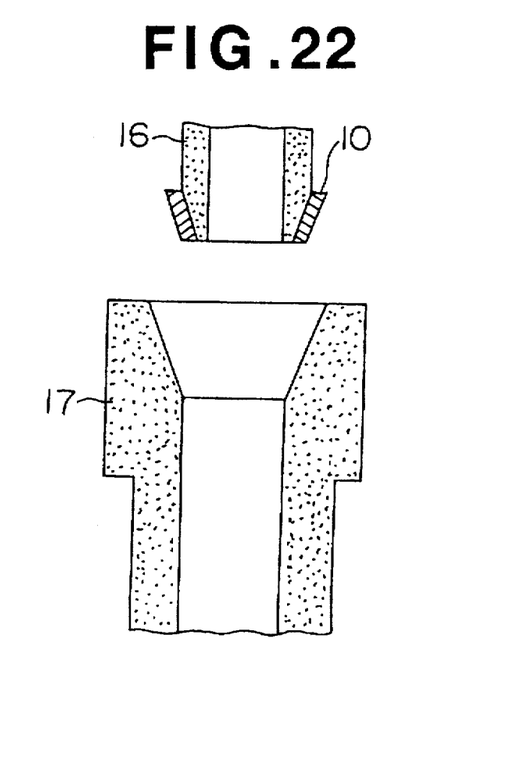

FIG. 21 and FIG. 22 each shows a state where a preheated submerged nozzle 15 or air sealing pipe 17 is fitted with a packing material previously adhered and mounted to the slide plate 11 or collector nozzle 10 at room temperature.

As described above, the packing material 10 according to the present invention was interposed in the members preheated at 800° C. and the fitting working was done to each apparatus. As the result, smoke generation was not observed until the setting of each member was finished (for about one minute), and the sealability between the members as packing materials was excellent.

Thus, the following effects will be achieved according to the packing material of the present invention.

(1) Even when applied to various preheated refractory members it is capable of controlling smoke generation about ten times (about 60 seconds) compared with known packing materials.

(2) Thus, it is easily to visually observe the deterioration of working environment and the fitting places during working.

(3) It is possible to retain the deformation control (or prevention) performance of the packing material until the completion of the fitting working.

INDUSTRIAL UTILIZATION

The packing material of the invention is excellent to be involved between refractories having good corrosion resistancy, airtightness and release properties to molten metals. Particularly, when used between shaped refractories of a flow control apparatus of molten metals said packing material achieves significant function and effect.

We claim:

1. A refractory nozzle shaped packing base material comprising covering, with an aluminum or its alloy foil, at least a part or the whole of the surfaces of said shaped packing base material for refractory, said material composition comprise inorganic refractory powder, an inorganic and/or organic fibrous raw material, and a binder, said foil having a thickness of 0.01 to 0.5 mm.

2. A refractory nozzle shaped packing base material as described in claim 1 wherein said aluminum or its alloy foil has recessed and raised portions.

3. A refractory nozzle shaped packing base material as described in claim 1 wherein the shaped refractory has packing base material adhered and mounted thereto, at least a part or the whole of the external surfaces of said packing base material previously adhered and mounted to the shaped refractor being covered with the aluminum or its alloy foil.

4. A refractory nozzle shaped packing base material as described in claim 1 wherein the upper surface and/or the lower surface of said packing base material are covered with the aluminum or its alloy foil, while the end faces of said packing base material are not covered with the metal foil.

5. A refractory nozzle shaped packing base material comprising covering with aluminum or its alloy foil having a thickness of 0.01 to 0.5 mm, at least one surface of said packing base material and covering the other surfaces with an inorganic paint having a thickness of 0.01 to 0.5 mm or a ceramic fiber sheet of 0.1 to 2.00 mm thickness.

6. A refractory nozzle shaped packing base material comprising said packing base material for refractory comprises inorganic refractory powder, an inorganic and/or organic fibrous raw material, and a binder having at least a part of the external surfaces of the packing base material covered with a first covering of an inorganic paint and/or a ceramic fiber sheet of 0.1 to 2.00 mm thickness, and an aluminum or its alloy foil having a thickness of 0.01 to 0.5mm covering the surface of said first covering.

* * * * *